Feb. 1, 1927.
H. B. WOMACK
FILE
Filed Jan. 23, 1926
1,616,403
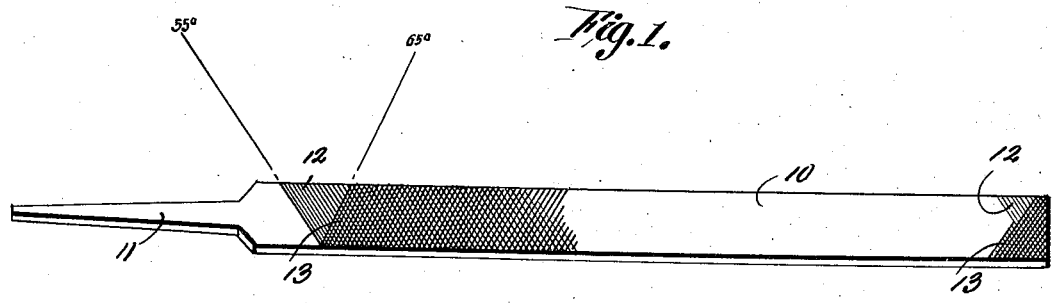
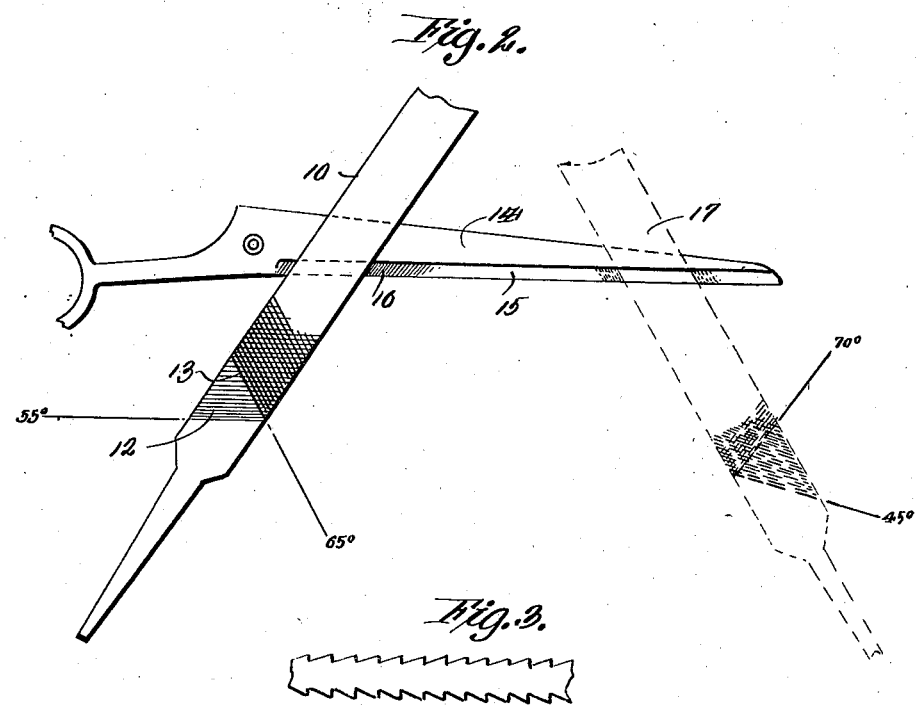
INVENTOR.
HENRY B. WOMACK Patented Feb. 1, 1927.

1,616,403

UNITED STATES PATENT OFFICE.

HENRY B. WOMACK, OF BIRMINGHAM, ALABAMA.

FILE.

Application filed January 23, 1926. Serial No. 83,344.

The present invention relates to improvements in files and has for its prime object to provide a file especially designed for filing the blades of shears and like implements.

A further object of the invention is the provision of a file constructed so as to form a series of furrows or corrugations in the work.

A still further object of the invention is the provision of a file provided with teeth of special arrangement so that shears and similar tools may be filed with great accuracy and facility.

Other objects and advantages of the invention will become apparent as the description progresses.

In the accompanying drawing forming a part of this specification and in which like numerals are employed to designate corresponding parts throughout the same:

Figure 1 is a top plan view of a file constructed in accordance with my invention, Figure 2 is a top plan view showing my improved file in operative position in association with a shear blade and diagrammatically illustrating the usual operation of a common form of file, and Figure 3 is an enlarged fragmentary side elevational view of the file.

The file structure forming the subject matter of this application is particularly devised for filing the beveled cutting edge of shear blades and similar tools. As is well known in the art, it is desirable when filing shears, to provide a plurality of fine evenly spaced corrugations or furrows so as to increase the efficient use of the shears. With the common forms of files, now usually employed for this purpose, the filing or dressing operation must be started from the outer end or point of the shear blade, due to the fact that the usual file has a tendency to draw or feed to the left, so that the blade is filed from the point of the blade to the handle end thereof. Attention is also invited to the fact that the common forms of files will not form true corrugations as the structure is usually arranged so that the teeth extend in diverging alignment and, therefore, the filing operation does not produce the desired effect.

Referring to the drawing, wherein for the purpose of illustration is shown the preferred embodiment of my invention, the numeral 10 generally indicates the file body or shank provided at the heel end with a tapered tang 11, this tang being provided for convenient attachment of a handle. The faces of the file shank 10 are provided with diagonal intersecting grooves or cuts arranged in a particular manner to form aligned cutting teeth barbs. The cuts are of uneven depth so as to cause the file to normally feed or draw to the right, so that the shear blade indicated in Figure 2, may be suitably filed from the handle end toward the pointed extremity.

With this in mind, it will be noted that the first or over cut 12 is formed on the faces of the file body 10 at an angle of 55° as shown to advantage in Figure 1. The upper cut 13 is then formed at an angle of 65° and is of deeper formation. This particular arrangement of the cuts or grooves 12 and 13 will form cutting teeth or barbs of lozenge or rhombus formation, arranged in straight alignment at a slight angular inclination to the longitudinal axis of the shank. The provision of the deeper upper or second cut partially fills up the first cut and will cause the file to feed slightly toward the right during its operation so as to facilitate the dressing of the work. Particular attention is called to the fact that the first cut extends from the toe end of the file body toward the tang, while the second cut extends from the tang toward the toe of the body. This arrangement of the cuts also tends to feed the file to the right.

With particular reference to Figure 2 of the drawing, the numeral 14 generally designates a conventional type of shear blade having a beveled cutting edge 15. Arranged in a diagonal position transversely of the shear blade adjacent the enlarged end thereof is shown my improved file structure 10 in operative position. By reciprocating the file over the cutting edge of the blade, the corrugations 16 are formed thereon and the file will naturally have a tendency to feed to the right or the pointed end of the blade. At the opposite end of the shear blade 14 I have conventionally illustrated a common form of file 17 shown provided with diagonal intersecting grooves at angles of 45° and 70°. This type of file, while forming a faint furrow on the beveled edge of the blade will not form the clear cut corrugations desirable, and as is obvious from this illustration, the file will tend to feed to the left which is inconvenient and inefficient.

It will thus be readily seen, that a file particularly suited for dressing the beveled cutting edges of shear blades has been devised, especially designed to permit convenient filing of the blades and the formation of spaced corrugations or furrows desirable in this type of implement.

In practice, it will be readily ascertained that the special form of file disclosed in the present application will materially facilitate the dressing operation of shears and similar tools so that the work may be accomplished more rapidly and in a more efficient and superior manner.

It is to be understood that the form of my invention herewith shown and described is to be taken as the preferred example of the same, and that the same is susceptible of modification as to its shape and size without departing from the spirit of the invention or the scope of the subjoined claim.

Having thus described my invention, I claim:

A corrugating file comprising a flat body and a tang, the body having angular parallel first cuts formed in the faces of the body at an angle of substantially fifty-five degrees extending from the toe of the body toward the tang, and angular intersecting second cuts formed on the faces over the first cuts extending from the tang toward the toe of the body at an angle of substantially sixty-five degrees, said second cuts partially filling in the first cuts, whereby the second cuts will draw the file in a right hand direction.

In testimony whereof I affix my signature.

HENRY B. WOMACK.